United States Patent
Zhou

(10) Patent No.: US 8,351,540 B2
(45) Date of Patent: Jan. 8, 2013

(54) CODEBOOK, CODEBOOK CREATING METHOD, UPLINK TRANSMISSION METHOD AND EQUIPMENT BASED ON THE CODEBOOK

(75) Inventor: Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/271,939

(22) Filed: Oct. 12, 2011

(65) Prior Publication Data
US 2012/0027125 A1 Feb. 2, 2012

Related U.S. Application Data

(63) Continuation of application No. PCT/CN2009/071502, filed on Apr. 27, 2009.

(51) Int. Cl.
H04L 27/00 (2006.01)
(52) U.S. Cl. .......................... 375/295; 375/145; 375/149
(58) Field of Classification Search .................. 375/295, 375/145, 149
See application file for complete search history.

(56) References Cited

U.S. PATENT DOCUMENTS

| | | | | |
|---|---|---|---|---|
| 7,929,415 B2* | 4/2011 | Kwak et al. | | 370/208 |
| 7,961,810 B2* | 6/2011 | Varadarajan et al. | | 375/295 |
| 8,000,401 B2* | 8/2011 | Lee et al. | | 375/260 |
| 8,014,453 B2* | 9/2011 | Zhou et al. | | 375/253 |
| 2008/0037669 A1 | 2/2008 | Pan et al. | | |
| 2008/0227495 A1 | 9/2008 | Kotecha et al. | | |
| 2008/0232501 A1 | 9/2008 | Khojastepour et al. | | |
| 2009/0034636 A1 | 2/2009 | Kotecha et al. | | |
| 2010/0045494 A1* | 2/2010 | Clerckx et al. | | 341/106 |
| 2010/0260243 A1* | 10/2010 | Ihm et al. | | 375/219 |
| 2011/0002404 A1* | 1/2011 | Choi et al. | | 375/260 |
| 2011/0135021 A1* | 6/2011 | Hatakawa et al. | | 375/260 |
| 2011/0222393 A1* | 9/2011 | Kwak et al. | | 370/208 |
| 2012/0128044 A1* | 5/2012 | Kim et al. | | 375/219 |

FOREIGN PATENT DOCUMENTS

| | | |
|---|---|---|
| CN | 101136718 A | 3/2008 |
| CN | 101242205 A | 8/2008 |
| WO | WO 2009/023700 A2 | 2/2009 |

OTHER PUBLICATIONS

International Search Report in corresponding PCT Application No. PCT/CN2009/071502 (Feb. 4, 2010).

* cited by examiner

*Primary Examiner* — Daniel Washburn
*Assistant Examiner* — Santiago Garcia
(74) *Attorney, Agent, or Firm* — Leydig, Voit & Mayer, Ltd.

(57) ABSTRACT

A codebook, a codebook creating method, and an uplink transmission method and equipment based on the codebook relating to per-coding in telecommunication are provided. In the method, a codebook size and a symbol set are determined. A minimum distance is calculated. A maximum codebook is selected according to the minimum distance. The method is used in per-coding of uplink transmission to reduce power loss of an uplink power amplifier.

12 Claims, 4 Drawing Sheets

CODEBOOK, CODEBOOK CREATING METHOD, UPLINK TRANSMISSION METHOD AND EQUIPMENT BASED ON THE CODEBOOK

CROSS-REFERENCE TO RELATED APPLICATIONS

This application is a continuation of International Application No. PCT/CN2009/071502, filed on Apr. 27, 2009, which is incorporated herein by reference in its entirety.

FIELD OF THE INVENTION

The present invention relates communication technologies, and in particular, to a codebook, a codebook creating method, an uplink transmission method and equipment based on the codebook.

BACKGROUND OF THE INVENTION

The uplink and downlink pre-coding method based on the codebook is a very important technology. The design of the uplink and downlink codebooks can greatly enhance the performance of the uplink and downlink.

In the new generation cellular radio mobile communication system, a matured downlink pre-coding method based on the codebook is available. However, no solution has been proposed for the uplink pre-coding method based on the codebook, where the uplink pre-coding method can improve the uplink throughput. To compensate this deficiency, the current solution is to use the downlink codebook directly as the uplink codebook to perform pre-coding.

However, to use the downlink codebook directly as the uplink codebook to perform pre-coding may increase power loss of the power amplifier

SUMMARY OF THE INVENTION

Embodiments of the present invention are directed to a codebook, a codebook creating method, and an uplink transmission method and equipment based on the codebook to reduce power loss of a power amplifier.

To achieve the above objective, embodiments of the present invention provide technical solutions as follows:

A codebook is provided, which includes one or any combination of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$.

A codebook creating method is provided, which includes:
determining a codebook size N and a symbol set $\Psi$ according to one or any combination of the following elements $$\frac{1}{\sqrt{2}}\begin{bmatrix} 1 & 0 & 1/\sqrt{2} \\ 0 & 1 & \gamma/\sqrt{2} \\ \alpha & 0 & -\alpha/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ 0 & \beta & -\beta\gamma/\sqrt{2} \\ \alpha & 0 & -\alpha/\sqrt{2} \end{bmatrix},$$

where $\alpha, \beta, \gamma \in \Psi$, $|\alpha|=1, |\beta|=1, |\gamma|=1$, and $\Psi$ contains M elements;
traversing $C_{3*M^{3}}^{N}$ types of codebooks, calculating a minimum distance $D_x$, $$D_x = \min_{i \neq j} \sqrt{\Sigma \operatorname{diag}(A_{i,j}^t \times A_{i,j})},$$

for each codebook $C_x$, where $A_{i,j}=(C_x^i)(C_x^i)'-(C_x^j)(C_x^j)'$, and $C_x^i$ represents the $i^{th}$ matrix in the codebook $C_x$; and
selecting a maximum codebook $C_{opt}$ corresponding to the minimum distance $C_x$.

A uplink transmission method based on a codebook is provided, which includes:
receiving a modulation mode, data transmission rank, and pre-coding code word sent from a network equipment, where the pre-coding code word is a matrix randomly selected from a codebook $C_{opt}$ stored in the network equipment, the codebook $C_{opt}$ including one or any combination of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$; and
determining power back-off for an uplink transmit amplifier and transmitting data according to the modulation mode, the data transmission rank, the pre-coding code word, and the codebook $C_{opt}$ that is locally stored.

A uplink transmission method based on a codebook is provide, which includes:
selecting a modulation mode, data transmission rank, and pre-coding code word, where the pre-coding code word is a matrix randomly selected from a codebook $C_{opt}$ that is locally stored, the codebook $C_{opt}$ including one or any combination of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{and}$$

-continued $$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$; and sending the modulation mode, data transmission rank, and pre-coding code word to a user equipment.

A user equipment includes:

a receiving unit, configured to receive a modulation mode, data transmission rank, and pre-coding code word sent from network equipment, where the pre-coding code word is a matrix randomly selected from a codebook $C_{opt}$ stored in the network equipment, the codebook $C_{opt}$ including one or any combination of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{ and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$;

a storage unit, configured to store the codebook $C_{opt}$; and a determining unit, configured to determine power back-off of an uplink transmit amplifier according to the modulation mode, the data transmission rank, the pre-coding code word, and the codebook $C_{opt}$ that is stored by the storage unit; and a transmitting unit, configured to transmit data according to the power back-off of the uplink transmit amplifier.

A network equipment includes:

a selecting unit, configured to select a modulation mode, data transmission rank, and pre-coding code word, where the pre-coding code word is a matrix randomly selected from a codebook $C_{opt}$ stored in the storage unit, the codebook $C_{opt}$ including one or any combination of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{ and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$;

a storage unit, configured to store the codebook $C_{opt}$; and a sending unit, configured to send the modulation mode, data transmission rank, and pre-coding code word to a user equipment.

A codebook creating apparatus includes:

an obtaining module, configured to obtain a codebook size N and a symbol set $\Psi$ according to one or any combination of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{ and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $\alpha, \beta, \gamma \in \Psi$, $|\alpha|=1, |\beta|=1, |\gamma|=1$, and $\Psi$ contains M elements;

a calculating module, configured to traverse $C_{3*M}{}^N$ types of codebooks and calculate a minimum distance $D_x$, $$D_x = \min_{i \neq j} \sqrt{\sum \text{diag}(A'_{i,j} \times A_{i,j})},$$

for each codebook $C_x$, where $A_{i,j} = (C_x^i)(C_x^i)' - (C_x^j)(C_x^j)'$, and $C_x^i$ represents the $i^{th}$ matrix in the codebook; and a selecting module, configured to select a maximum codebook $C_{opt}$ corresponding to the minimum distance $D_x$.

According to the codebook, codebook creating method, and uplink transmission method and equipment provided by the embodiments of the present invention, a new codebook is put forward. The codebook is used for pre-coding, which may reduce power loss of an uplink power amplifier.

BRIEF DESCRIPTION OF THE DRAWINGS

To make the technical solutions of the present invention or the prior art clearer, the accompanying drawings for illustrating the embodiments of the present invention or the prior art are outlined below. Apparently, the accompanying drawings are for the exemplary purpose only, and persons of ordinary skill in the art can derive other drawings from such accompanying drawings without any creative effort.

DETAILED DESCRIPTION OF THE EMBODIMENTS

The technical solutions of the present invention are clearly and completely described below with reference to accompanying drawings in embodiments of the present invention. Evidently, the embodiments are merely some rather than all of embodiments of the present invention. On the basis of the embodiments of the present invention, all other embodiments derived by persons skilled in the art without making any creative effort should fall within the protection scope of the present invention.

Figure 1:
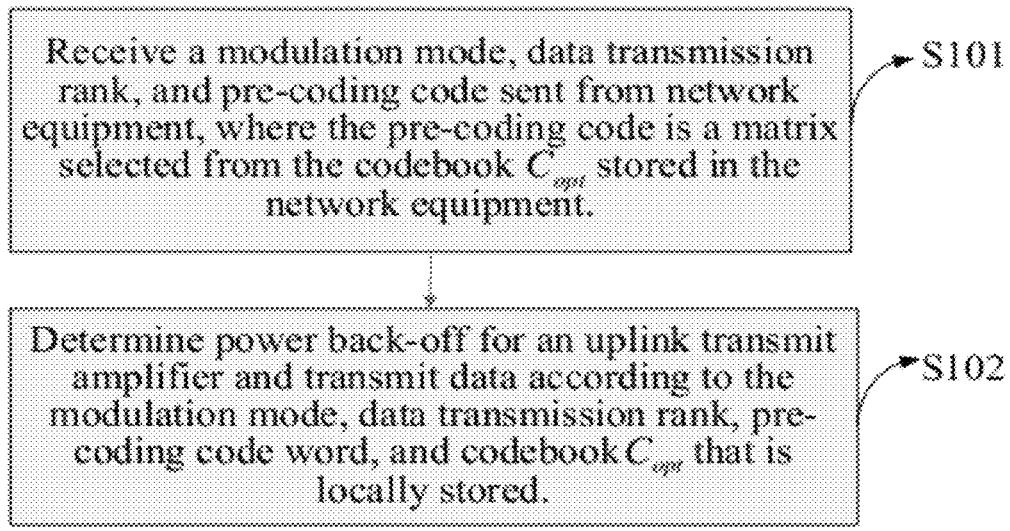
FIG. 1 is a flowchart of an uplink transmission method based on a codebook according to an embodiment of the present invention.

An embodiment of the present invention provides an uplink transmission method based on a codebook. Referring to FIG. 1, the method includes:

S101: Receive a modulation mode, data transmission rank, and pre-coding code word sent from a network equipment, where the pre-coding code word is a matrix randomly selected from a codebook $C_{opt}$ stored in the network equipment, the codebook $C_{opt}$ including one or any combination of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{ and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$.

S102: Determine power back-off of an uplink transmit amplifier and transmit data according to the modulation mode, the data transmission rank, the pre-coding code word, and the codebook $C_{opt}$ that is locally stored.

The locally stored codebook $C_{opt}$ may be a codebook calculated out locally or may be sent by the network equipment, or may be directly configured in the user equipment.

According to the uplink transmission method provided by the embodiment of the present invention, a new codebook $C_{opt}$ is put forward. When compared with the prior art, the design of the new codebook may reduce the power back-off of the uplink transmit amplifier and hence reduce the power loss of the power amplifier.

Figure 2:
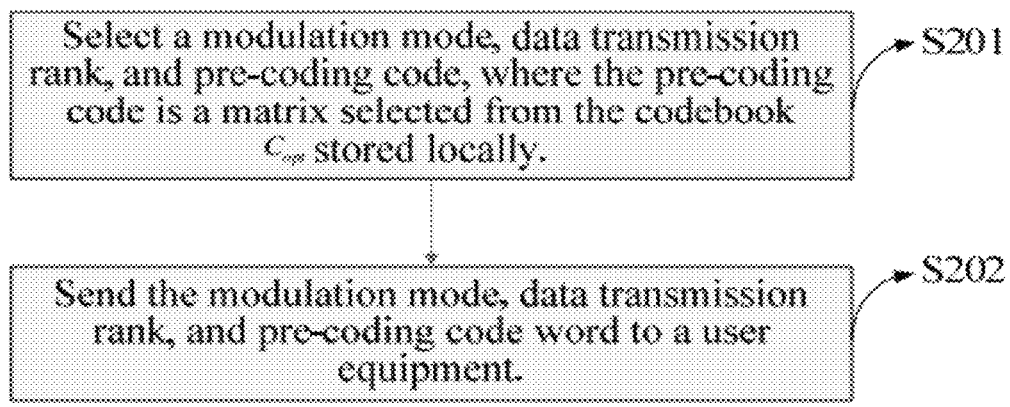
FIG. 2 is a flowchart of an uplink transmission method based on a codebook according to another embodiment of the present invention.

An embodiment of the present invention provides another uplink transmission method based on a codebook. Referring to FIG. 2, the method includes:

S201: Select a modulation mode, data transmission rank, and pre-coding code word, where the pre-coding code word is a matrix randomly selected from codebook $C_{opt}$ that is locally stored, the codebook $C_{opt}$ including one or any combination of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{ and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$.

S202: Send the modulation mode, data transmission rank, and pre-coding code word to a user equipment.

The locally stored codebook $C_{opt}$ may be calculated out locally or may be directly configured in the user equipment.

According to the uplink transmission method provided by the embodiment of the present invention, a new codebook $C_{opt}$ is put forward. The design of the new codebook may reduce the power back-off of the uplink transmit amplifier and hence reduce the power loss of the power amplifier.

Figure 3:
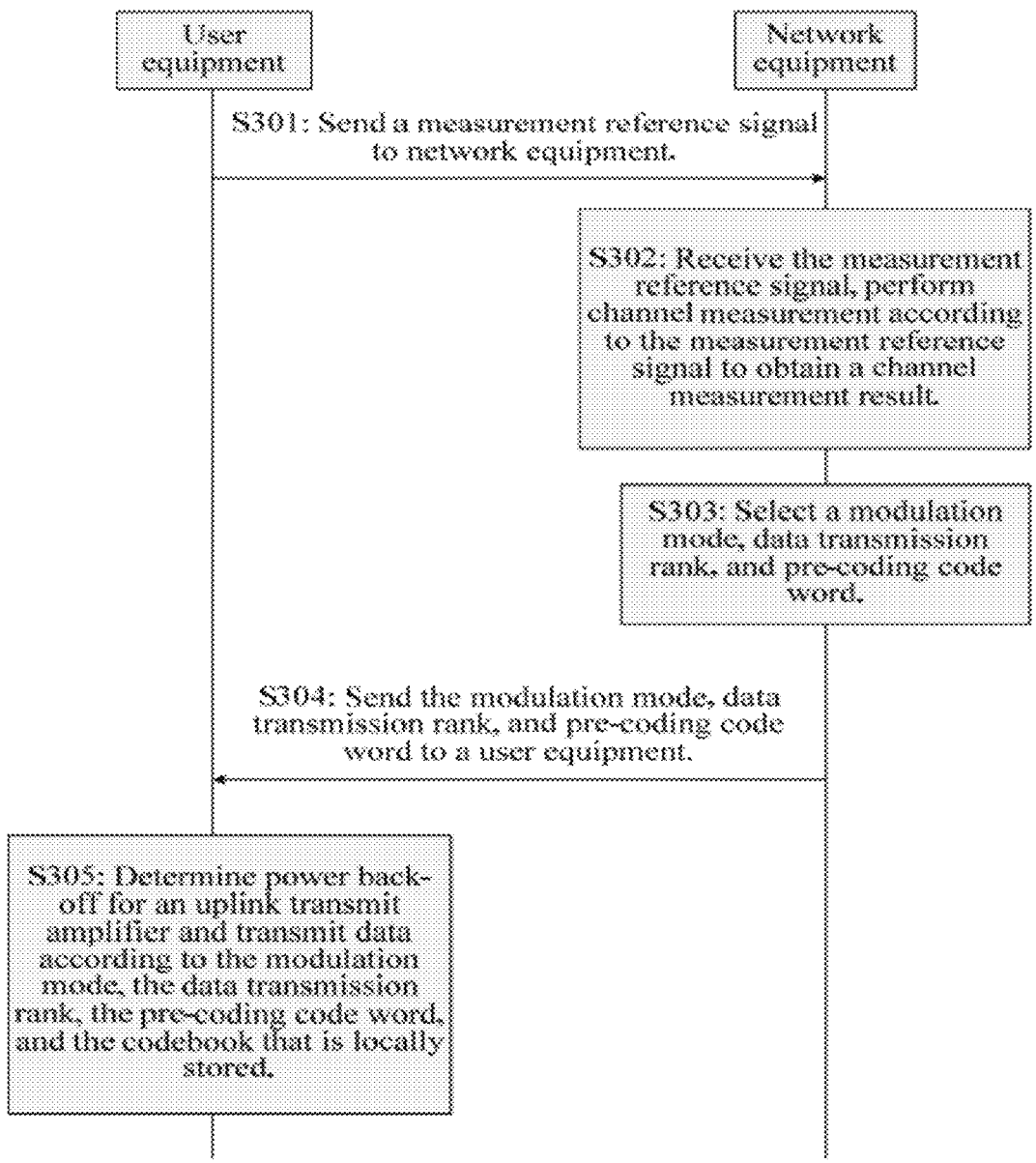
FIG. 3 is a flowchart of an uplink transmission method based on a codebook according to still another embodiment of the present invention.

Still another embodiment of the present invention provides an uplink transmission method based on a codebook. Referring to FIG. 3, the method includes:

S301: A user equipment sends a measurement reference signal to a network equipment.

S302: The network equipment receives the measurement reference signal from the user equipment and performs channel measurement according to the measurement reference signal to obtain a channel measurement result.

S303: The network equipment selects a modulation mode, data transmission rank, and pre-coding code according to the channel measurement result, where the pre-coding code word is a matrix selected randomly from a codebook $C_{opt}$ stored in the network equipment.

S202: The network equipment sends the modulation mode, data transmission rank, and pre-coding code word to the user equipment.

S102: The user equipment determines power back-off of an uplink transmit amplifier and transmits data according to the modulation mode, the data transmission rank, the pre-coding code word, and the codebook $C_{opt}$ that is locally stored.

According to the uplink transmission method provided by the embodiment of the present invention, a new codebook $C_{opt}$ is put forward. The design of the new codebook may reduce the power back-off of the uplink transmit amplifier and hence reduce the power loss of the power amplifier.

Embodiment 1

An uplink pre-coding method provided by Embodiment 1 of the present invention takes quadrature phase shift keying (QPSK) modulation mode as an example for illustration. However, the modulation mode that can be applied is not limited to the QPSK modulation mode in this embodiment. Other modulation modes may also be used in the embodiment of the present invention.

A codebook $C_{opt}$ used in the uplink pre-coding method according to this embodiment of the present invention includes one or any combination of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$, and $\alpha, \beta, \gamma \in \Psi$.

For example, it can be assumed that the QPSK's symbol set $\Psi=\{\pm 1, \pm j\}$, and a codebook size N=16, and rank 3 is used as an example for description.

In this embodiment, $C_{3*M}{}^N$ types of codebooks are traversed, where M is the number of elements contained in the symbol set $\Psi$. Under the preceding assumption, M is 2, a minimum distance $D_x$ is calculated for each codebook $C_x$ according to the formula $$D_x = \min_{i \neq j} \sqrt{\sum \text{diag}(A'_{i,j} \times A_{i,j})},$$

where $A_{i,j} = (C_x^i)(C_x^i)' - (C_x^j)(C_x^j)$, and $C_x^i$ represents the $i^{th}$ matrix (i is counted from the first matrix, i=1, 2, 3, 4, ..., 16) in the codebook $C_x$.

Then a maximum codebook $C_{opt}$ corresponding to the minimum distance $D_x$ is selected. The codebook $C_{opt}$ includes the following matrices:

$$\begin{bmatrix} 1 & 0 & 1/\sqrt{2} \\ 1 & 0 & -1\sqrt{2} \\ 0 & 1 & 1/\sqrt{2} \\ 0 & -j & j/\sqrt{2} \end{bmatrix}, \begin{bmatrix} 1 & 0 & 1/\sqrt{2} \\ 1 & 0 & -1/\sqrt{2} \\ 0 & 1 & -1/\sqrt{2} \\ 0 & -j & -j/\sqrt{2} \end{bmatrix}, \begin{bmatrix} 1 & 0 & 1/\sqrt{2} \\ 1 & 0 & -1/\sqrt{2} \\ 0 & 1 & j/\sqrt{2} \\ 0 & j & 1/\sqrt{2} \end{bmatrix},$$

$$\begin{bmatrix} 1 & 0 & 1/\sqrt{2} \\ 1 & 0 & -1/\sqrt{2} \\ 0 & 1 & -j/\sqrt{2} \\ 0 & j & -1/\sqrt{2} \end{bmatrix}, \begin{bmatrix} 1 & 0 & 1/\sqrt{2} \\ -j & 0 & j/\sqrt{2} \\ 0 & 1 & 1/\sqrt{2} \\ 0 & 1 & -1/\sqrt{2} \end{bmatrix}, \begin{bmatrix} 1 & 0 & 1/\sqrt{2} \\ -j & 0 & j/\sqrt{2} \\ 0 & 1 & -1/\sqrt{2} \\ 0 & 1 & 1/\sqrt{2} \end{bmatrix},$$

$$\begin{bmatrix} 1 & 0 & 1/\sqrt{2} \\ -j & 0 & j/\sqrt{2} \\ 0 & 1 & j/\sqrt{2} \\ 0 & -1 & j/\sqrt{2} \end{bmatrix}, \begin{bmatrix} 1 & 0 & 1/\sqrt{2} \\ -j & 0 & j/\sqrt{2} \\ 0 & 1 & -j/\sqrt{2} \\ 0 & -1 & -j/\sqrt{2} \end{bmatrix}, \begin{bmatrix} 1 & 0 & 1/\sqrt{2} \\ -1 & 0 & 1/\sqrt{2} \\ 0 & 1 & j/\sqrt{2} \\ 0 & -j & -1/\sqrt{2} \end{bmatrix},$$

$$\begin{bmatrix} 1 & 0 & 1/\sqrt{2} \\ -1 & 0 & 1/\sqrt{2} \\ 0 & 1 & 1/\sqrt{2} \\ 0 & -j & 1/\sqrt{2} \end{bmatrix}, \begin{bmatrix} 1 & 0 & 1/\sqrt{2} \\ -1 & 0 & 1/\sqrt{2} \\ 0 & 1 & 1/\sqrt{2} \\ 0 & j & -j/\sqrt{2} \end{bmatrix}, \begin{bmatrix} 1 & 0 & 1/\sqrt{2} \\ -1 & 0 & 1/\sqrt{2} \\ 0 & 1 & -1/\sqrt{2} \\ 0 & j & j/\sqrt{2} \end{bmatrix},$$

$$\begin{bmatrix} 1 & 0 & 1/\sqrt{2} \\ j & 0 & -j/\sqrt{2} \\ 0 & 1 & j/\sqrt{2} \\ 0 & 1 & -j/\sqrt{2} \end{bmatrix}, \begin{bmatrix} 1 & 0 & 1/\sqrt{2} \\ j & 0 & -j/\sqrt{2} \\ 0 & 1 & -j/\sqrt{2} \\ 0 & 1 & j/\sqrt{2} \end{bmatrix}, \begin{bmatrix} 1 & 0 & 1/\sqrt{2} \\ j & 0 & -j/\sqrt{2} \\ 0 & 1 & 1/\sqrt{2} \\ 0 & -1 & 1/\sqrt{2} \end{bmatrix}, \text{and}$$

$$\begin{bmatrix} 1 & 0 & 1/\sqrt{2} \\ j & 0 & -j/\sqrt{2} \\ 0 & 1 & -1/\sqrt{2} \\ 0 & -1 & -1/\sqrt{2} \end{bmatrix}.$$

According to this embodiment, for example, a computer may be used to perform offline calculation to obtain the codebook $C_{opt}$ according to the preceding method, or the codebook $C_{opt}$ may be obtained by performing calculation in a high-performance network equipment or a user equipment according to the preceding method.

In the uplink transmission, assume that the inverse fast Fourier transform (IFFT) count is 512, valid data count is 300, by using the codebook $C_{opt}$ provided in the embodiments of the present invention, CM=3.2 dB is obtained in QPSK modulation mode according to the formula $$CM = \frac{20\log_{10}\{\text{rms}[v_{norm}^3(t)]\} - 1.52}{1.56} + 0.77 \text{ dB}.$$

CM is a metric reflecting the power back-off. That is, the power back-off of the uplink transmit amplifier is 3.2 dB. The power back-off in the prior art is 3.8 dB. With the codebook $C_{opt}$ provided in the embodiments of the present invention, in QPSK modulation mode, a 0.6 dB power gain is obtained as compared with the prior art.

In addition, as regards rank 1 codebook used by some users, if this embodiment further defines that any column in any matrix in the preceding codebook $C_{opt}$ is rank 1 codebook $C_{opt}$, the optimized matrices are as follows:

$$\begin{bmatrix} 1/\sqrt{2} & 1 & 0 \\ 1/\sqrt{2} & -1 & 0 \\ 1/\sqrt{2} & 0 & 1 \\ 1/\sqrt{2} & 0 & -1 \end{bmatrix}, \begin{bmatrix} 1/\sqrt{2} & 1 & 0 \\ j/\sqrt{2} & -j & 0 \\ -1/\sqrt{2} & 0 & 1 \\ -j/\sqrt{2} & 0 & -j \end{bmatrix}, \begin{bmatrix} 1/\sqrt{2} & 1 & 0 \\ -1/\sqrt{2} & 1 & 0 \\ 1/\sqrt{2} & 0 & 1 \\ -1/\sqrt{2} & 0 & 1 \end{bmatrix},$$

$$\begin{bmatrix} 1/\sqrt{2} & 1 & 0 \\ -j/\sqrt{2} & j & 0 \\ -1/\sqrt{2} & 0 & 1 \\ j/\sqrt{2} & 0 & j \end{bmatrix}, \begin{bmatrix} 1/\sqrt{2} & 1 & 0 \\ (1+j)/2 & 0 & 1 \\ j/\sqrt{2} & 0 & (1-j)/\sqrt{2} \\ (-1+j)/2 & (1-j)/\sqrt{2} & 0 \end{bmatrix},$$

$$\begin{bmatrix} 1/\sqrt{2} & 1 & 0 \\ (-1+j)/2 & 0 & 1 \\ -j/\sqrt{2} & 0 & (1-j)/\sqrt{2} \\ (1+j)/2 & (-1-j)/\sqrt{2} & 0 \end{bmatrix}.$$

$$\begin{bmatrix} 1/\sqrt{2} & 1 & 0 \\ (-1-j)/2 & 0 & 1 \\ j/\sqrt{2} & 0 & (1+j)/\sqrt{2} \\ (1-j)/2 & (-1+j)/\sqrt{2} & 0 \end{bmatrix},$$

$$\begin{bmatrix} 1/\sqrt{2} & 1 & 0 \\ (1-j)/2 & 0 & 1 \\ -j/\sqrt{2} & 0 & (1-j)/\sqrt{2} \\ (-1-j)/2 & (1+j)/\sqrt{2} & 0 \end{bmatrix}, \begin{bmatrix} 1/\sqrt{2} & 1 & 0 \\ 1/\sqrt{2} & 0 & 0 \\ -1/\sqrt{2} & 0 & 1 \\ -1/\sqrt{2} & 1 & 0 \end{bmatrix},$$

$$\begin{bmatrix} 1/\sqrt{2} & 1 & 0 \\ j/\sqrt{2} & 0 & 1 \\ 1/\sqrt{2} & 0 & j \\ j/\sqrt{2} & -j & 0 \end{bmatrix}, \begin{bmatrix} 1/\sqrt{2} & 1 & 0 \\ -1/\sqrt{2} & 0 & 1 \\ -1/\sqrt{2} & 0 & -1 \\ 1/\sqrt{2} & -1 & 0 \end{bmatrix}, \begin{bmatrix} 1/\sqrt{2} & 1 & 0 \\ -j/\sqrt{2} & 0 & 1 \\ 1/\sqrt{2} & 0 & -j \\ -j/\sqrt{2} & j & 0 \end{bmatrix},$$

$$\begin{bmatrix} 1/\sqrt{2} & 1 & 0 \\ 1/\sqrt{2} & 0 & 1 \\ 1/\sqrt{2} & -1 & 0 \\ -1/\sqrt{2} & 0 & 1 \end{bmatrix}, \begin{bmatrix} 1/\sqrt{2} & 1 & 0 \\ 1/\sqrt{2} & -1 & 0 \\ -1/\sqrt{2} & 0 & 1 \\ 1/\sqrt{2} & 0 & 1 \end{bmatrix},$$

$$\begin{bmatrix} 1/\sqrt{2} & 1 & 0 \\ -1/\sqrt{2} & 1 & 0 \\ 1/\sqrt{2} & 0 & 1 \\ 1/\sqrt{2} & 0 & -1 \end{bmatrix}, \text{ and } \begin{bmatrix} 1/\sqrt{2} & 1 & 0 \\ -1/\sqrt{2} & 0 & 1 \\ -1/\sqrt{2} & 1 & 0 \\ -1/\sqrt{2} & 0 & -1 \end{bmatrix}.$$

Accordingly, these matrices may also apply to the rank 1 codebooks used by some users.

If the codebook $C_{opt}$ is calculated offline, the calculated codebook $C_{opt}$ needs to be configured in the user equipment and network equipment. In this embodiment, the network equipment may be, for example, a base station.

Figure 4:
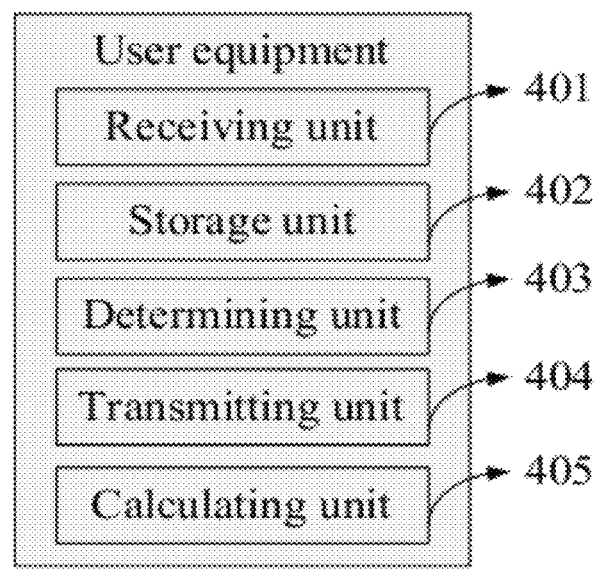
FIG. 4 is a structure view of a user equipment according to an embodiment of the present invention.

Referring to FIG. 4, the user equipment provided in an embodiment of the present invention includes: a receiving unit 401, a storage unit 402, a determining unit 403, and a transmitting unit 404.

The receiving unit 401 is configured to receive a modulation mode, data transmission rank, and pre-coding code word sent from network equipment, where the pre-coding code word is a matrix randomly selected from a codebook $C_{opt}$ stored in the network equipment, the codebook $C_{opt}$ including one or any combination of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{ and }$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$.

The storage unit is configured to store the codebook $C_{opt}$.

The determining unit 403 is configured to determine power back-off of an uplink transmit amplifier according to the modulation mode, the data transmission rank, the pre-coding code word, and the codebook $C_{opt}$ that is stored by the storage unit 402.

The transmitting unit 404 is configured to transmit data according to the power back-off of the uplink transmit amplifier.

The user equipment provided in the embodiment of the present invention can determine power back-off of a new uplink transmit amplifier according to a new codebook $C_{opt}$. The power back-off of the uplink transmit amplifier is smaller than the power back-off when the current codebook is used. Therefore, power loss is reduced.

Further, the user equipment may include:
a calculating unit 405, configured to calculate out the codebook $C_{opt}$ and store the codebook $C_{opt}$ to the storage unit 402.

Further, the receiving unit 401 is further configured to receive the codebook $C_{opt}$ and store the codebook $C_{opt}$ to the storage unit 402.

Figure 5:
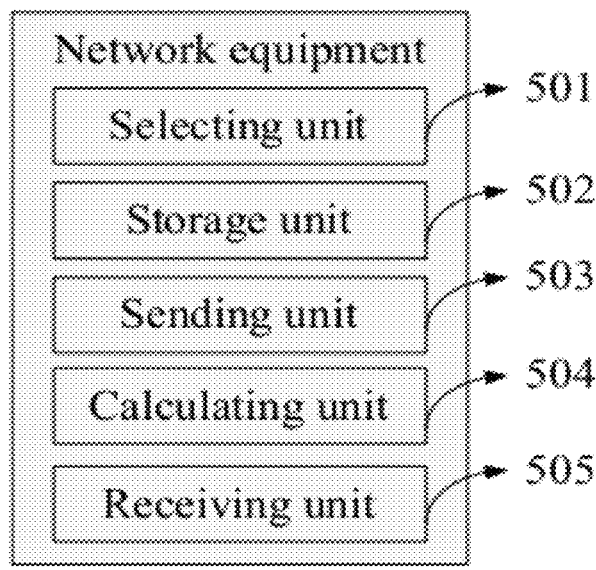
FIG. 5 is a structure view of a network equipment according to an embodiment of the present invention.

Referring to FIG. 5, the network equipment provided in an embodiment of the present invention includes: a selecting unit 501, a storage unit 502, and a sending unit 503.

The selecting unit 501 is configured to select a modulation mode, data transmission rank, and pre-coding code word, where the pre-coding code word is a matrix randomly selected from codebook $C_{opt}$ stored in the storage unit 502, the codebook $C_{opt}$ including one or any combination of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{ and }$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$.

The storage unit 502 is configured to store the codebook $C_{opt}$.

The sending unit 503 is configured to send the modulation mode, data transmission rank, and pre-coding code word to a user equipment.

The network equipment provided in the embodiment of the present invention stores a new codebook $C_{opt}$. By using the new codebook, a user equipment can determine the power back-off of the new uplink transmit amplifier. The power back-off of the uplink transmit amplifier is smaller than the power back-off when the current codebook is used. Therefore, power loss is reduced.

Further, the network equipment may further include:

a calculating unit 504, configured to calculate out the codebook $C_{opt}$ and store the codebook $C_{opt}$ to the storage unit 502; and a receiving unit 505, configured to receive the codebook $C_{opt}$ and store the codebook $C_{opt}$ to the storage unit 502.

Figure 6:
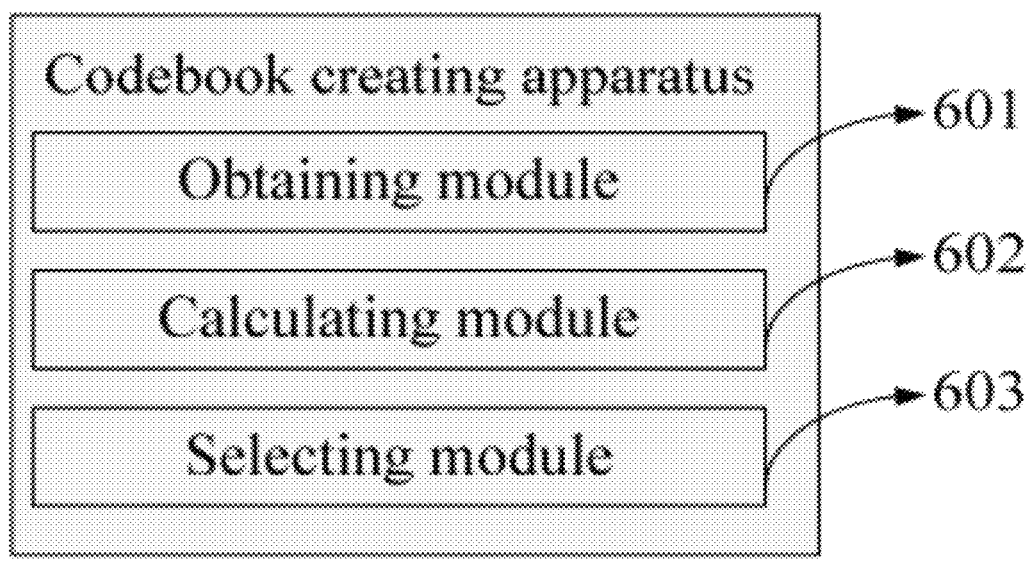
FIG. 6 is a structure view of a codebook creating apparatus according to an embodiment of the present invention.

Referring to FIG. 6, the codebook creating apparatus provided in an embodiment of the present invention includes: an obtaining module 601, a calculating module 602, and a selecting module 603.

The obtaining module 601 is configured to obtain a codebook size N and a symbol set Ψ according to one or any combination of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $\alpha,\beta,\gamma \in \Psi$, $|\alpha|=1, |\beta|=1, |\gamma|=1$, and Ψ contains M elements.

The calculating module 602 is configured to traverse $C_{3*M}{}^N$ types of codebooks, calculate a minimum distance $D_x$, $$D_x = \min_{i \neq j} \sqrt{\sum \text{diag}(A'_{i,j} \times A_{i,j})},$$

for each codebook $C_x$, where $A_{i,j}=(C_x{}^i)(C_x{}^i)'-(C_x{}^j)(C_x{}^j)$, and $C_x{}^i$ represents the $i^{th}$ matrix in the codebook $C_x$.

The selecting module 603 is configured to select a maximum codebook $C_{opt}$ corresponding to the minimum distance $D_x$.

The codebook creating apparatus provided in the embodiment of the present invention can create a new codebook. By using this new codebook, a user equipment can determine the power back-off of the new uplink transmit amplifier. The power back-off of the uplink transmit amplifier is smaller than the power back-off when the current codebook is used. Therefore, power loss is reduced.

The above are merely exemplary embodiments of the present invention. The protection scope of the present invention is not limited thereto. Variations or replacements readily derived by persons skilled in the art within the technical scope disclosed by the present invention should fall within the protection scope of the present invention. Therefore, the protection scope of the present invention is subjected to the appended claims.

What is claimed is:

1. A codebook creating method, comprising:
   determining a codebook size N and a symbol set Ψ, by a network equipment, according to at least one of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

wherein $\alpha,\beta,\gamma \in \Psi$, $|\alpha|=1, |\beta|=1, |\gamma|=1$, and contains M elements;

traversing $C_{3*M}{}^N$ types of codebooks, calculating a minimum distance $D_x$, $$D_x = \min_{i \neq j} \sqrt{\sum \text{diag}(A'_{i,j} \times A_{i,j})},$$

for each codebook $C_x$, wherein $A_{i,j}=(C_x{}^i)(C_x{}^i)'-(C_x{}^j)(C_x{}^j)$ and $C_x{}^i$ representing the $i^{th}$ matrix in the codebook $C_x$; and selecting a maximum codebook $C_{opt}$ corresponding to the minimum distance $D_x$.

2. An uplink transmission method based on a codebook, comprising:

receiving a modulation mode, data transmission rank, and pre-coding code word sent from a network equipment, wherein the pre-coding code word is a matrix randomly selected from codebook $C_{opt}$ stored in the network equipment, the codebook $C_{opt}$ comprising at least one of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$; and determining power back-off of an uplink transmit amplifier and transmitting data according to the modulation mode, the data transmission rank, the pre-coding code word, and the codebook $C_{opt}$ that is locally stored.

3. The method according to claim 1, wherein creating the codebook $C_{opt}$ comprises:

determining the codebook size N and the symbol set $\Psi$, wherein $\alpha,\beta,\gamma \in \Psi$, and $\Psi$ contains M elements;

traversing $C_{3*M}^N$ types of codebooks, calculating the minimum distance $D_x$, $$D_x = \min_{i \neq j} \sqrt{\sum \text{diag}(A'_{i,j} \times A_{i,j})},$$

for each codebook $C_x$, wherein $A_{i,j} = (C_x^i)(C_x^i)' - (C_x^j)(C_x^j)'$, and $C_x^i$ represents the $i^{th}$ matrix in the codebook $C_x$; and selecting a maximum codebook $C_{opt}$ corresponding to the minimum distance $D_x$.

4. The method according to claim 3, wherein the uplink transmit amplifier's power back-off determined by the codebook $C_{opt}$ is calculated out by using the following formula:

$$CM = \frac{20\log_{10}\{\text{rms}[v^3_{norm}(t)]\} - 1.52}{1.56} + 0.77 \text{ dB}.$$

5. An uplink transmission method based on a codebook, comprising:

selecting a modulation mode, data transmission rank, and pre-coding code word, wherein the pre-coding code word is a matrix randomly selected from a codebook $C_{opt}$ that is locally stored, the codebook $C_{opt}$ comprising at least one of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma/\sqrt{2} \\ \alpha & 0 & -\alpha/\sqrt{2} \\ 0 & \beta & -\beta\gamma/\sqrt{2} \end{bmatrix},$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$; and sending the modulation mode, data transmission rank, and pre-coding code word to a user equipment.

6. The method according to claim 5, wherein creating the codebook $C_{opt}$ comprises:

determining a codebook size N and a symbol set $\Psi$, wherein $\alpha,\beta,\gamma \in \Psi$, and $\Psi$ contains M elements;

traversing $C_{3*M}^N$ types of codebooks, calculating a minimum distance $D_x$, $$D_x = \min_{i \neq j} \sqrt{\sum \text{diag}(A'_{i,j} \times A_{i,j})}$$

for each codebook $C_x$, wherein $A_{i,j} = (C_x^i)(C_x^i)' - (C_x^j)(C_x^j)'$, $C_x^i$ represents $i^{th}$ matrix in the codebook $C_x$; and selecting a maximum codebook $C_{opt}$ corresponding to the minimum distance $D_x$.

7. A user equipment, comprising:

a receiving unit, configured to receive a modulation mode, data transmission rank, and pre-coding code word sent from network equipment, wherein the pre-coding code word is a matrix randomly selected from codebook $C_{opt}$ stored in the network equipment, the codebook $C_{opt}$ comprising at least one of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{ and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$;

a storage unit, configured to store the codebook $C_{opt}$;

a determining unit, configured to determine power back-off of an uplink transmit amplifier according to the modulation mode, the data transmission rank, the pre-coding code word, and the codebook $C_{opt}$ that is stored by the storage unit; and a transmitting unit, configured to transmit data according to the power back-off of the uplink transmit amplifier.

8. The user equipment according to claim 7, further comprising:

a calculating unit, configured to calculate out the codebook $C_{opt}$ and store the codebook $C_{opt}$ to the storage unit.

9. The user equipment according to claim 7, wherein the receiving unit is further configured to receive the codebook $C_{opt}$, and store the codebook $C_{opt}$ to the storage unit.

10. A network equipment, comprising:

a selecting unit, configured to select a modulation mode, data transmission rank, and pre-coding code word, wherein the pre-coding code word is a matrix randomly selected from codebook $C_{opt}$ stored in a storage unit, the codebook $C_{opt}$ comprising at least one of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{ and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

where $|\alpha|=1, |\beta|=1, |\gamma|=1$;

the storage unit, configured to store the codebook $C_{opt}$; and a sending unit, configured to send the modulation mode, data transmission rank, and pre-coding code word to a user equipment.

11. The network equipment according to claim 10, further comprising:
  a calculating unit, configured to calculate out the codebook $C_{opt}$ and store the codebook $C_{opt}$ to the storage unit; and
  a receiving unit, configured to receive the codebook $C_{opt}$ and store the codebook $C_{opt}$ to the storage unit.

12. A codebook creating apparatus, comprising:
  an obtaining module, configured to obtain a codebook size N and a symbol set $\Psi$ according to at least one of the following elements:

$$\frac{1}{\sqrt{2}}\begin{bmatrix} 1 & 0 & 1/\sqrt{2} \\ \alpha & 0 & -\alpha/\sqrt{2} \\ 0 & 1 & \gamma/\sqrt{2} \\ 0 & \beta & -\beta\gamma/\sqrt{2} \end{bmatrix}, \frac{1}{\sqrt{2}}\begin{bmatrix} 1 & 0 & 1/\sqrt{2} \\ 0 & 1 & \gamma\sqrt{2} \\ \alpha & 0 & -\alpha/\sqrt{2} \\ 0 & \beta & -\beta\gamma/\sqrt{2} \end{bmatrix}, \text{ and}$$

$$\frac{1}{\sqrt{2}}\begin{bmatrix} 1 & 0 & 1/\sqrt{2} \\ 0 & 1 & \gamma/\sqrt{2} \\ 0 & \beta & -\beta\gamma/\sqrt{2} \\ \alpha & 0 & -\alpha/\sqrt{2} \end{bmatrix},$$

wherein $\alpha,\beta,\gamma \in \Psi$, $|\alpha|=1, |\beta|=1, |\gamma|=1$, and $\Psi$ contains M elements;

a calculating module, configured to traverse $C_{3*M}^{N}$ types of codebooks and calculate a minimum distance $D_x$, $$D_x = \min_{i \neq j} \sqrt{\sum \text{diag}(A'_{i,j} \times A_{i,j})},$$

for each codebook $C_x$, wherein $A_{i,j}=(C_x^{i})(C_x^{i})'-(C_x^{j})(C_x^{j})'$, represents the $i^{th}$ matrix in the codebook $C_x$; and a selecting module, configured to select a maximum codebook $C_{opt}$ corresponding to the minimum distance $D_x$.

* * * * *